United States Patent Office 3,165,496
Patented Jan. 12, 1965

3,165,496
HALOMETHYL HYDROCARBON-SUBSTITUTED PHENOLS
James V. Fusco and Samuel B. Robison, Westfield, and Alfred L. Miller, Cranford, N.J., assignors to Esso Research and Engineering Company, a corporation of Delaware
No Drawing. Original application June 12, 1957, Ser. No. 665,246, now Patent No. 3,093,613, dated June 11, 1963. Divided and this application Oct. 31, 1961, Ser. No. 148,833
29 Claims. (Cl. 260—59)

The present invention deals with the formation of halogenated polymethylol phenol resins. More particularly, it relates to the formation of halomethyl hydrocarbon-substituted phenol substances preferably containing a minor portion of bromine or chlorine.

The present application is a divisional application of Serial No. 665,246, filed June 12, 1957, in the names of the present inventors, now U.S. Patent No. 3,093,613, patented June 11, 1963.

It has now been discovered that a highly useful class of materials can be prepared by halogenating dimethylol hydrocarbon-substituted phenol resins. The resulting products have been found to be highly advantageous agents for curing rubbers, and in particular butyl rubber-type polymers.

Butyl rubber or GR-I (Government Rubber-Isobutylene) contains about 85–99.5% (preferably about 95–99.5%) of a $C_4$–$C_7$ isoolefin, such as isobutylene with about 15 to 0.5% (preferably about 5 to 0.5 wt. percent) of a multiolefin of about 4–14, preferably 4–8, carbon atoms. The expression "butyl rubber" as employed in the specification and claims, is intended to include copolymers having about 90–99.5% by weight of an isoolefin of about 4–7 carbon atoms and about 10 to 0.5% by weight of a conjugated multiolefin of about 4–10 carbon atoms. The preparation of butyl type rubbers is described in U.S. Patent 2,356,128. In general, the rubber comprises the reaction product of a $C_4$–$C_7$ isoolefin, preferably isobutylene with a $C_4$–$C_{10}$, preferably a $C_4$–$C_6$, conjugated diolefin such as isoprene, butadiene, dimethyl butadiene, piperylene, etc. The product of isobutylene and isoprene is preferred.

The halomethyl hydrocarbon-substituted phenols of the present invention may be obtained by halogenating polymethylol phenols, such as 2,6-dimethylol para-substituted phenols, either in the monomeric or polymeric form, so as to at least partially substitute halogen for the hydroxyl portion of the methylol groups. The halogenation may be carried out at temperatures ranging between about 0 and 150° C., but preferably from 20 to 80° C. using an appropriate halogenating agent. Among the halogenating agents which have been found suitable for the purposes of the present invention are gaseous hydrogen fluoride, hydrogen chloride, hydrogen bromide, hydrogen iodide, or solutions thereof, gaseous chlorine, liquid bromine, alkali metal hypochlorites or hypobromites, concentrated aqueous hydrogen iodine solutions, $C_4$ to $C_{10}$ tertiary alkyl hypochlorites, sulfur bromides, sulfuryl chloride, pyridinium chloride perchloride, N-bromosuccinimide, alpha-chloroacetoacetanilide, N,N'-dichloro-5,5 dimethylhydantoin, iodine halides, trichlorophenol chloride, N-chloroacetamide, beta-bromo-methyl phthalimide, etc. The preferred halogenating agents are gaseous hydrogen fluoride, hydrogen chloride, hydrogen bromide, hydrogen iodine, chlorine and substances which form hydrogen halide under reaction conditions, such as liquid bromine.

Generally the polymethylol compound or resin which is to be halogenated is dissolved in a substantially inert organic solvent, such as hexane, benzene, chloroform, or carbon tetrachloride, to form a 20 to 50 wt. percent solution which is then contacted with a halogenating agent according to conventional techniques for a period ranging from a few minutes up to several days, depending upon the reactivity of the specific halogenating agent. The amount of halogenating agent employed will vary according to the amount of halogen which is to be incorporated in the polymethylol substance. For instance, if one wishes to substitute halogen for both hydroxyl groups in the ortho position of 2,6-dimethylol octyl phenol, he should react 2 moles of hydrogen chloride with each mole of a dimethylol phenol compound. In some instances it may be desirable to use more or less than this amount of halogenating agent depending on whether or not the polymethylol substance is monomeric or polymeric. Thus, one mole of a polymethylol phenol substance may be reacted with as little as 0.3 mole or as much as 4 moles of halogenating agent. The halogenated polymethylol hydrocarbon-substituted phenol can contain from 1 to 60 wt. percent of combined halogen but, for most purposes, it is not necessary to put more than about 30 wt. percent of combined halogen into the polymethylol compound to obtain a product having the wanted properties. Furthermore, the halogen content of the polymethylol phenol condensate will vary according to the particular halogen. For example, while the preferred chlorine or bromine content is between about 2 and 16 wt. percent, the preferred iodine content is between about 5 and 30 wt. percent of the condensate.

The halomethyl hydrocarbon-substituted phenols coming within the purview of the present invention are those which have a hydrocarbon group in the meta or para position. The phenol portion may be either monohydric or polyhydric. The monomeric form of these curing agents falls under the following general formula:

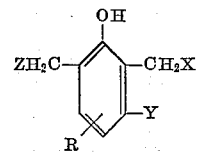

wherein R is an alkyl, aryl, or alkaryl hydrocarbon containing 4 to 16 carbon atoms located in the meta or para position (4–5 position); X is a halogen such as fluorine, chlorine, bromine, or iodine; and Y is hydrogen or hydroxy and Z is the same as X or is hydroxyl.

Among the compounds coming under this general formula are 2,6-dichloromethyl-4-tertiarybutyl phenol, 2,6-dichloromethyl-4-octyl phenol, 2,6-diiodomethyl-4-dodecyl phenol, 2,6-dichloromethyl-4-phenyl phenol, 2,6-dibromomethyl-5-pentadecyl phenol, 2,6-dibromomethyl-5-pentadecyl resorcinol and 2,6-dibromomethyl-4-cumyl phenol. If desired, these compounds may be blended with polymethylol compounds or resins to obtain a composition having the desired curing rate.

Also, products obtained by the controlled halogenation of methylol containing resins prepared by the condensation of an aldehyde, for example, formaldehyde, with the following representative substituted phenols: 4-tertiarybutyl phenol, 4-octyl phenol, 4-dodecyl phenol, 4-phenyl phenol, 4-nonyl phenol, 4-hydroxydiphenyl methane, 2,bis-(4-hydroxy phenyl) propane, and 5-pentadecyl phenol, and mixtures thereof may be used directly to cure butyl rubber or they may be blended with non-halogenated methylol-containing resin to obtain the wanted reactivity.

The polymethylol hydrocarbon-substituted phenols that are halogenated according to the present invention can be prepared by reacting a substituted phenol having the two ortho positions unoccupied with a molar excess of an aldehyde. For instance, 2 moles of formaldehyde may be reacted with a mole of phenol compound in the presence of a strong alkaline catalyst, such as an alkali metal hydroxide, at a temperature between about 25 and 100° C. The 2,6-dimethylol phenol compound formed in this manner may be neutralized and isolated by acidification of the mixture and separation of the oily layer. If desired, the monomer may be polymerized by heating at elevated temperatures, e.g., 75 to 175° C. The polymer should be oil soluble and heat reactive. Suitable methods for the preparation of para-substituted dimethylol phenol compounds are described by Honel in U.S. Patent 1,996,069 and Charlton et al. in U.S. Patent 2,364,192. Alternately, the methylhalo hydrocarbon-substituted phenols may be made directly by condensing the phenol and aldehyde in the presence of a hydrogen halide or a hydrogen halide-forming substance.

The various aspects and modifications of the present invention will be made more clearly apparent by reference to the following description and accompanying examples.

EXAMPLE 1

A chlorinated resin was prepared by dissolving 300 gms. of Amberol ST-137 in 800 ml. of beneze and contacting it with anhydrous hydrogen chloride gas at 70° C. for 2 hours. The reaction product after stripping off the solvent under 200 mm. of mercury absolute pressure contained 10.16% chlorine and had a dark red color. Amberol ST-137 is a trade designation for a mixture of multicyclic dimethylol phenol believed to be made directly from one mole of para-octyl phenol, two moles of formaldehyde and one mole of sodium hydroxide, the alkali being carefully neutralized when the condensation is complete. It is a solid phenolic resin at room temperature and contains 79.75% carbon, 10.26% hydrogen, 9.11% oxygen and a methylol content of 6.5%.

Next, 150.5 parts by weight of the master batch were compounded with 5 parts of zinc oxide and 12 parts of either Amberol ST-137 or the chlorinated resin. Each recipe was then cured at 320° F. for 60 minutes and evaluated for stress-strain and flexing properties.

*Table I*

| Stress-Strain Properties | Resin | Chloro-Resin |
| --- | --- | --- |
| Modulus at 200% | 250 | 935 |
| Modulus at 300% | 475 | 1,900 |
| Tensile Strength, p.s.i. | 2,039 | 2,050 |
| Elongation, percent | 840 | 390 |

GOODRICH FLEXOMETER DATA AT 100° C., 30 CPS., 0.25" STROKE, 89 P.S.I. LOAD

| | | |
| --- | --- | --- |
| Percent Permanent Set | 14.4 | 1.7 |
| Percent Dynamic Drift | 3.1 | 0.0 |
| Temp. Rise, ° C | 34 | 23 |
| Appearance of Slug after Flexing 30 mins | Good | Excellent |

While the resin cured butyl rubber had a good tensile strength, it was less desirable than the chloro-resin cured butyl in some of the other properties. The enhanced activity of the halogen-modified resins is demonstrated by the generally higher low extension moduli and improved flexometer data. In the flexometer test, which is an accepted method of testing vulcanizate permanence, low values for percent permanent set, percent dynamic drift and temperature rise are desirable. Degradation of the vulcanizate during flexing is generally noted by the generation of porosity in the center of the test specimen. The data illustrate that the halo-resin vulcanizate is outstanding in flexometer performance as well as moduli at 200 and 300%. These unexpected results clearly demonstrate the advantages of these halogenated curing agents.

EXAMPLE 2

A halomethyl hydrocarbon-substituted phenolic resin was prepared by injecting anhydrous hydrogen bromide gas through an agitated solution consisting of 800 ml. of benzene containing 300 gms. of dimethylol para-octyl phenol resin which was prepared by the alkaline catalyzed condensation of two moles of formaldehyde with one mole of para-octyl phenol. This resin, which is sold under the trade name of SP-1045 by the Schenectady Varnish Co., was analyzed and found to contain 78.29% by weight carbon, 10.56% by weight hydrogen, 11.00% by weight oxygen, and to have a methylol content of 9.2% by weight (procedure described in Analytical Chemistry, vol. 23, No. 6, pages 883-884) as well as a calculated average molecular weight of 930. After adding the anhydrous hydrogen bromide gas to the solution at a rate of about 0.1 liter/minute for from 5 to 360 mins., the halogenated resin solution was filtered and the benzene removed by distillation under 200 mm. absolute pressure with a gradual increase in pot temperature from 25 to 100° C. The preparation of these resins and their properties is set forth in Table II.

*Table II*

RESIN PREPARATION—CONDITIONS OF REACTION WITH HYDROGEN BROMIDE GAS

| Resin | #1 | #2 | #3 | #4 | #5 | #6 | #7 | #8 |
| --- | --- | --- | --- | --- | --- | --- | --- | --- |
| Reaction Temperature, ° C. | Between 24 and 31° C. | | | | | | 50 | 80. |
| Reaction Time, Min | 5 | 15 | 30 | 75 | 98 | 360 | 30 | 30. |
| Bromine Content of Resin, Wt. Percent. | 0.87 | 1.99 | 4.39 | 7.25 | 11.19 | 16.07 | 4.79 | 4.08. |
| Appearance at Room Temperature. | Hard Light Brown. | Hard Light Brown. | Hard Brown | Hard Brown | Tacky Dark Brown. | Tacky Dark Brown. | Hard Brown | Hard Brown. |

Twelve parts by weight of each of these resins and 5 parts by weight of zinc oxide were compounded with 150.5 parts by weight of a butyl rubber master batch having the following recipe:

MASTER BATCH

| | Parts by weight |
| --- | --- |
| GRI-17 | 100 |
| HAF Black | 25 |
| SRF Black | 25 |
| Stearic Acid | 0.5 |

The GRI-17 polymer was isobutylene-isoprene butyl rubber having a viscosity average molecular weight of 410,000, a 1.5 mole percent unsaturation and a Mooney viscosity at 212° F. of 66. The master batch, bromine-containing resins, and zinc oxide were press cured for 30 minutes at 307° F.

Table III contains the physical properties of the vulcanizates.

Table III

| Resin | #1 | #2 | #3 | #4 | #5 | #6 | #7 | #8 |
|---|---|---|---|---|---|---|---|---|
| Modulus at 200%, p.s.i. | | 170 | 550 | 640 | 1,020 | 1,450 | 525 | 550 |
| Modulus at 300%, p.s.i. | 200 | 370 | 1,020 | 1,200 | 1,780 | | 925 | 975 |
| Tensile Strength, p.s.i. | 990 | 2,040 | 2,040 | 1,960 | 1,960 | 2,030 | 1,930 | 2,050 |
| Elongation at Break, percent | 870 | 870 | 570 | 490 | 350 | 320 | 580 | 630 |

GOODRICH FLEXOMETER TEST[1], 100° C. OVEN TEMP., 0.25 IN. STROKE, 1800 R.P.M., 89 P.S.I. LOAD, 30 MIN. TEST DURATION

| | | | | | | | | |
|---|---|---|---|---|---|---|---|---|
| Permanent Set, percent | ([2]) | 29.6 | 7.4 | 3.8 | 2.7 | 2.5 | 7.8 | |
| Dynamic Drift, percent | | 8.0 | 2.7 | 1.9 | 0.4 | 1.3 | 3.3 | |
| Temperature Rise, ° C. | | 43 | 26 | 30 | 22 | 28 | 28 | |
| Appearance | | ([3]) | | | Excellent | | | |

[1] Instrument Description see ASTM Test D-623-52T.
[2] Too soft to test.
[3] Very Porous.

The data show that the optimum amount of bromine in the resin is between about 2 and 16%. The Mooney scorch data at 260° F. in Table IV demonstrate that the best processing characteristics are obtained when the resin contains between about 3 and 7% bromine.

Table IV

| Resin | #1 | #2 | #3 | #4 | #5 | #6 | #7 | #8 |
|---|---|---|---|---|---|---|---|---|
| Mooney Scorch at 260° F. Small Rotor, Mins. to Rise 5 Points Over minimum | >24 | >20 | 26 | 11 | 1 | 0.5 | | |

EXAMPLE 3

Example 2 was repeated except that anhydrous hydrogen chloride gas was used to halogenate the SP-1045 resin.

may be diluted with non-halogenated resin to bring the halogen content to within the desired range.

EXAMPLE 4

The following example serves to demonstrate a method of preparing the halomethyl phenolic substances without first preparing and isolating the methylol condensation product. In this example the halogenated product is formed in situ in a single step.

A solution of 110 grams of para-nonyl phenol in 100 ml. of petroleum ether was added dropwise over a 30-minute period to an agitated solution consisting of 162 grams of 37% formaldehyde and 30 ml. of concentrated hydrogen chloride acid while keeping the solution saturated with hydrogen chloride gas and chilled to 15° C. Upon completion of the reaction, the hydrocarbon layer was washed three times with an equal volume of water and the petroleum ether solvent was removed by evapo- Table V.—Chlorine Containing Resins

RESIN PREPARATION, CONDITIONS OF REACTION WITH HYDROGEN CHLORIDE GAS

| Resin | #9 | #10 | #11 | #12 | #13 | #14 | #15 |
|---|---|---|---|---|---|---|---|
| Reaction Temperature | Between 24° and 31° C. | | | | | | |
| Reaction Time, Minutes | 4 | 22 | 40 | 95 | 70 | 240 | 660 |
| Chlorine Content, Percent | 0.31 | 1.46 | 1.61 | 3.74 | 6.21 | 11.47 | 13.55 |
| Appearance at Room Temp | Hard Light Brown. | Hard Light Brown. | Hard Brown. | Hard Brown. | Hard Brown. | Semi-Fluid. Dark Brown. | Semi-Fluid. Dark Brown. |

EVALUATION AS CURING AGENT FOR BUTYL RUBBER

| Masterbatch, pts | 150.5 | 150.5 | 150.5 | 150.5 | 150.5 | 150.5 | 150.5. |
| Zinc Oxide, pts | 5 | 5 | 5 | 5 | 5 | 5 | 5. |
| Resin (above), pts | 12 | 12 | 12 | 12 | 12 | 12 | 12. |

MOONEY SCORCH AT 260° F., TIME TO 5 PT. RISE OVER MINIMUM, SMALL ROTOR

| Minutes | >20 | >20 | >20 | >20 | 1 | 4 | 11. |

ROOM TEMPERATURE PHYSICAL PROPERTIES, CURED 30 MIN. @ 307° F.

| Modulus @ 200%, p.s.i. | | 270 | 300 | 375 | 475 | 410 | 975. |
| Modulus @ 300%, p.s.i. | 175 | 500 | 500 | 700 | 925 | 860 | 1,525. |
| Tensile Strength, p.s.i. | 1,180 | 1,950 | 1,950 | 2,065 | 2,090 | 2,160 | 2,040. |
| Elongation at Break, Percent [1] | 1,040 | 780 | 800 | 710 | 600 | 640 | 450. |

GOODRICH FLEXOMETER TEST, 100° C. OVEN, 1,800 R.P.M., 0.25 IN. STROKE, 89 P.S.I. LOAD, 30 MIN. TEST DURATION

| Permanent Set, Percent | ([2]) | 17.5 | | | 7.8 | 11.1 | |
| Dynamic Drift, Percent | | 6.4 | | | 2.3 | 3.9 | |
| Temperature Rise, ° C. | | 36 | | | 29 | 38 | |
| Appearance | | Slightly Porous. | | | Excellent | Good | |

[1] Instrument described in ASTM Test D-623-52T.
[2] Too soft to test.

Again, the data show that the best cures are obtained with a resin containing about 2 to 16 weight percent chlorine; however, for processability, the Mooney data indicate the halogen content should be about 2 to 6 weight percent. Of course, the resins which scorch the butyl ration on a steam bath. The brown colored chloromethyl resin recovered had the consistency of heavy molasses and contained 10.42% chlorine. Twelve parts by weight of the product was compounded with 100 parts by weight of isobutylene-isoprene butyl rubber (GRI-17), 50 parts by weight of MPC carbon black, 0.5 part by weight stearic acid, and 5 parts by weight of zinc oxide. The resulting blend was cured for 60 min. at 320° F. and the vulcanizate formed had the following properties:

*Table VI*

| | |
|---|---|
| 300% modulus, p.s.i. | 550 |
| Tensile at break, p.s.i. | 2030 |
| Elongation at break, percent | 700 |
| Tear (lbs.) | 190 |
| Goodrich Flexometer data @ 100° C., 0.25" stroke, 0.25 static compression, 1800 r.p.m.: | |
| Percent permanent set | 10.1 |
| Percent dynamic drift | 3.7 |
| Temperature rise, ° C. | 33 |
| Appearance | Very good |

The data show that an in situ preparation is a suitable method for preparing these halomethyl phenol curing agents.

EXAMPLE 5

A xylene solution containing 15 wt. percent of polymeric 2,6-dimethylol-5-pentadecyl phenol was reacted with anhydrous gaseous hydrogen chloride at 100° C. for one hour. The reaction product was recovered by precipitating with acetone and found to contain 5.16 wt. percent chlorine. Ten parts by weight of the reaction product is blended with 100 parts by weight of 3% isoprene-97% isobutylene butyl rubber and 5 parts by weight of zinc oxide and cured at 320° F. for 60 minutes. The vulcanizate has excellent flexing and physical properties.

EXAMPLE 6

A series of experiments was carried out to define the concentration of haloresin necessary to produce a good cure. The same butyl rubber employed in Example 2 was compounded according to the following formulations:

*Table VII*

| Recipes | 16 | 17 | 18 | 19 |
|---|---|---|---|---|
| Butyl Rubber (GRI-17) | 100 | 100 | 100 | 100 |
| SRF Carbon Black | 25 | 25 | 25 | 25 |
| HAF Carbon Black | 25 | 25 | 25 | 25 |
| Stearic Acid | 0.5 | 0.5 | 0.5 | 0.5 |
| Zinc Oxide | 5.0 | 5.0 | 5.0 | 5.0 |
| Chloro-Resin, Parts by Weight | 15 | 10 | 5 | 2 |

CURED 30' @ 152° C.

| | | | | |
|---|---|---|---|---|
| Stress-Strain Properties: | | | | |
| 200% Ext. Modulus, p.s.i. | 700 | 550 | 375 | <200 |
| 300% Ext. Modulus, p.s.i. | 1,225 | 1,000 | 725 | |
| Tensile at Break, p.s.i. | 1,970 | 2,090 | 1,990 | <700 |
| Percent Elongation | 490 | 610 | 670 | 1,100+ |

GOODRICH FLEXOMETER DATA @ 100° C., 32 CPS., 0.25" STROKE, 89 P.S.I. LOAD, 30 MIN. TEST

| | | | | |
|---|---|---|---|---|
| Percent Permanent Set | 1.2 | 1.9 | 12.4 | Could not be run. |
| Percent Dynamic Drift | 0.0 | 0.0 | 4.6 | |
| Temperature Rise, ° C. | 19 | 21 | 48 | |
| Appearance | Excellent | | Good | |

The chloro-resin, which contained 10.16% chlorine, was the same as that used in Example 1. The data show that, under the conditions of the experiment, amounts greater than 2 parts by weight of chloro-resin per 100 parts by weight of butyl rubber are necessary to vulcanize the butyl rubber under relatively mild conditions, while amounts of about 10 to 15 parts by weight are optimum for the production of vulcanizates having excellent stress-strain properties.

Various modifications to the present invention will suggest themselves to those skilled in the art. While the present halogenated dimethylol hydrocarbon-substituted phenols have particular utility as a vulcanizing agent for butyl rubber, they may be used in other applications.

Having described the present invention, that which is sought to be protected is set forth in the following claims.

What is claimed is:

1. A composition of matter containing halomethyl and methylol groups obtained by halogenating a composition selected from the group consisting of: (A) the reaction product of formaldehyde with (1) a phenol having the formula:

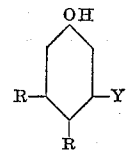

wherein each R is selected from the group consisting of hydrogen, $C_4$-$C_{16}$ alkyl, aryl, and alkaryl, and wherein at least one R is hydrogen and Y is selected from the group consisting of hydrogen and hydroxyl; and (B) mixtures of formaldehyde with (1), the content of combined halogen being between about 1 and about 30 wt. percent of the halogenated product and insufficient to completely substitute halogen for the hydroxyl radicals of the methylol groups.

2. A composition of matter as in claim 1 wherein the reaction product of formaldehyde and said phenol is halogenated.

3. A composition of matter as in claim 1 wherein a mixture of formaldehyde and said phenol is halogenated.

4. A composition of matter as in claim 2 wherein about 2 mols of formaldehyde per mole of said phenol is used.

5. A composition of matter as in claim 3 wherein about 2 moles of formaldehyde per mole of said phenol is used.

6. A composition of matter as in claim 1 wherein the halogen is in an amount between about 2 and about 16 wt. percent and is selected from the group consisting of chlorine and bromine.

7. A composition of matter as in claim 6 wherein the halogen is bromine.

8. A process for preparing a composition of matter containing halomethyl and methylol groups which comprises halogenating with a halogenating agent, at a temperature between about 0° C. and about 150° C., a composition selected from the group consisting of: (A) the reaction product of formaldehyde and (1) a phenol having the formula:

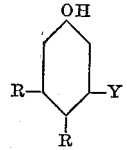

wherein each R is selected from the group consisting of hydrogen, $C_4$-$C_{16}$ alkyl, aryl, and alkaryl, and wherein at least one R is hydrogen and Y is selected from the group consisting of hydrogen and hydroxyl; and (B) mixtures of formaldehyde with (1), to obtain a product having a content of combined halogen of between about 1 and about 30 wt. percent of the halogenated product and insufficient to completely substitute halogen for the hydroxyl radicals of the methylol groups.

9. A process as in claim 8 wherein the halogen combined in the halogenated product is between about 2 and about 16 wt. percent and is selected from the group consisting of chlorine and bromine.

10. A composition of matter obtained by brominating a phenolic material selected from the group consisting of 2,6-dihydroxymethyl 4-alkyl phenols, resitols of such hydroxymethyl 4-alkyl phenols wherein the resitol has an average of up to 4 phenol units, and a mixture of a 4-alkyl phenol with 0.5 to 2.1 mols of formaldehyde per mol of said phenol said alkyl group containing 4 to 16 carbon atoms and the average bromine content of the brominated material being from about 1 to about 9%, said bromine being the only additive to said phenolic material.

11. A composition according to claim 10 wherein the bromine content of the material is about 4 to 5%.

12. Bromomethyl 4-alkyl phenol formaldehyde resols wherein the alkyl group has 4 to 16 carbon atoms and the bromine content of the resol is about 1 to 9%, said bromine being the only additive to said phenolic material, and said bromomethyl 4-alkyl phenol formaldehyde resol having been obtained by brominating a 4-alkyl phenol formaldehyde resol.

13. Bromomethyl 4-alkyl phenol formaldehyde resols wherein the alkyl group has 4 to 16 carbon atoms and the bromine content of the resol is about 4 to 5%, said bromine being the only additive to said phenolic material, and said bromomethyl 4-alkyl phenol formaldehyde resol having been obtained by brominating a 4-alkyl phenol formaldehyde resol.

14. Bromomethyl 4-alkyl phenol formaldehyde resitols wherein the alkyl group has 4 to 16 carbon atoms and the bromine content of the resitol is about 1 to 9% having up to an average of 4 phenol units in the molecule, said bromine being the only additive to said phenolic material, and said bromomethyl 4-alkyl phenol formaldehyde resitol having been obtained by brominating a 4-alkyl phenol formaldehyde resitol.

15. Bromomethyl 4-alkyl phenol formaldehyde resitols wherein the alkyl group has 4 to 16 carbon atoms and the bromine content of the resitol is about 4 to 5% having up to an average of 4 phenol units in the molecule, said bromine being the only additive to said phenolic material, and said bromomethyl 4-alkyl phenol formaldehyde resitol having been obtained by brominating a 4-alkyl phenol formaldehyde resitol.

16. A composition according to claim 10 wherein the alkyl group contains 8 carbon atoms.

17. A composition according to claim 10 wherein the bromomethyl compound has an average of about 4 to 5% of bromine.

18. A composition according to claim 10 wherein the bromine content of the material is about 4 to 5% and the alkyl group contains 8 carbon atoms.

19. A composition according to claim 18 wherein the bromomethyl material is a formaldehyde resitol.

20. A composition according to claim 10 wherein the alkyl group is the tertiary butyl group.

21. A composition according to claim 20 wherein the material has an average of about 4 to 5% of bromine.

22. A composition according to claim 10 wherein the alkyl group is a butyl group.

23. A process of preparing a brominated alkyl phenol which comprises reacting a 4-alkyl phenol wherein the alkyl group has 4 to 16 carbon atoms with formaldehyde and hydrogen bromide in an amount sufficient to form a bromomethyl alkyl phenol compound having 1 to 9% of bromine.

24. A process according to claim 23 wherein the amount of hydrogen bromide added is such as to form a bromomethyl alkyl phenol compound having 4 to 5% of bromine in the molecule.

25. A process according to claim 23 carried out in aqueous medium.

26. A process according to claim 23 wherein the alkyl phenol is a 4-octyl phenol.

27. A process according to claim 23 wherein the alkyl phenol is a 4-butyl phenol.

28. A process according to claim 27 wherein the alkyl phenol is 4-tertiary butyl phenol.

29. The process of preparing a bromomethyl 4-alkyl phenol resitol having from 4 to 16 carbon atoms in the alkyl group and in which the resitol has up to an average of 4 phenolic nuclei per molecule comprising reacting 1 mol of the corresponding alkyl phenol with 0.5 to 2.1 mols of formaldehyde and hydrogen bromide, the hydrogen bromide being present in an amount sufficient to form a resitol having 1 to 9% of bromine and stopping the reaction before the resitol goes beyond the tetramer stage.

References Cited in the file of this patent

UNITED STATES PATENTS 2,809,999     Chiddix et al. _____ Oct. 15, 1957
2,972,600     Braidwood _____ Feb. 21, 1961

OTHER REFERENCES

Martin: The Chemistry of Phenolic Resins, 1956, John Wiley & Sons, Inc., New York, pages 127–136.